United States Patent [19]

Ealing

[11] Patent Number: 4,832,903
[45] Date of Patent: May 23, 1989

[54] DRY STORAGE ARRANGEMENTS FOR NUCLEAR FUEL

[75] Inventor: Christopher J. Ealing, Leicestershire, England

[73] Assignee: The English Electric Company Limited, England

[21] Appl. No.: 193,268

[22] Filed: May 11, 1988

Related U.S. Application Data

[63] Continuation of Ser. No. 943,675, Dec. 17, 1986, abandoned, which is a continuation-in-part of Ser. No. 694,428, Jan. 24, 1985, abandoned.

[30] Foreign Application Priority Data

Feb. 1, 1984 [GB] United Kingdom ............... 8402669

[51] Int. Cl.$^4$ ...................... G21C 19/08; G21C 19/40
[52] U.S. Cl. .................................................. 376/272
[58] Field of Search ............... 376/272, 250, 251, 253, 376/310; 250/506.1, 507.1; 252/633; 405/128

[56] References Cited

U.S. PATENT DOCUMENTS

| | | | |
|---|---|---|---|
| 4,016,749 | 4/1977 | Wachter | 376/272 |
| 4,277,361 | 7/1981 | Szulinski | 376/272 |
| 4,410,802 | 10/1983 | Szulinski | 250/506.1 |
| 4,427,893 | 1/1984 | Queiser et al. | 250/506.1 |
| 4,500,227 | 2/1985 | Courtois et al. | 252/633 |
| 4,649,018 | 3/1987 | Waltersdorf et al. | 376/272 |
| 4,713,199 | 12/1987 | Spilker et al. | 376/272 |

FOREIGN PATENT DOCUMENTS

| | | | |
|---|---|---|---|
| 0049438 | 4/1982 | European Pat. Off. | 376/272 |
| 0093671 | 11/1983 | European Pat. Off. | 252/633 |
| 2730729 | 1/1979 | Fed. Rep. of Germany | 376/272 |
| 2909549 | 9/1980 | Fed. Rep. of Germany | 376/272 |
| 1225768 | 7/1960 | France | 376/253 |
| 1583303 | 1/1981 | United Kingdom | 376/272 |
| 2061798 | 5/1981 | United Kingdom | 376/272 |
| 2096937 | 10/1982 | United Kingdom | 376/272 |

OTHER PUBLICATIONS

"Equipment Designs for the Spent Light Water Reactor Fuel Dry Storage Demonstration", by R. J. Steffen et al.

Primary Examiner—Deborah L. Kyle
Assistant Examiner—Daniel Wasil
Attorney, Agent, or Firm—Kirschstein, Kirschstein, Ottinger & Israel

[57] ABSTRACT

A storage arrangement for nuclear fuel has a plurality of storage tubes connected by individual pipes to manifolds which are connected, in turn, to a venting system for maintaining the tubes at supra-atmospheric, atmospheric, or subatmospheric pressure, and means for producing a flow of a cooling fluid, such as air, over the exterior surfaces of the tubes.

18 Claims, 3 Drawing Sheets

DRY STORAGE ARRANGEMENTS FOR NUCLEAR FUEL

This is a continuation, of application Ser. No. 943,675 filed Dec. 17, 1986, now abandoned, which is a continuation-in-part of copending application Ser. No. 694,428, filed Jan. 24, 1985, now abandoned.

BACKGROUND OF THE INVENTION

1. Field of the Invention

This invention relates to storage arrangements for irradiated fuel following its removal from nuclear reactors. The invention can also relate to the storage of pre-irradiated fuel and also vitrified waste after spent fuel reprocessing.

2. Description of the Related Art

It is a common practice to store spent fuel under water, in what are generally known as pond stores, for periods that are long enough to allow the decay heat and radiation levels to reduce sufficiently to allow the fuel to be transported with safety. However, the use of a pond store is not entirely satisfactory where the fuel needs to be stored for any considerable length of time.

Thus, the ability to store the fuel safely for protracted periods in a water environment is very dependent upon the materials of the cladding in which the fuel is accommodated, the irradiation history of the fuel and/or the cladding, the integrity of the cladding, and the quality of the water in which the fuel is stored. Thus, cooling and shielding functions can be carried out completely satisfactorily while the fuel cladding remains intact, and while the water is present.

However, if the fuel cladding is perforated by corrosion or handling, then fission products can escape, and both fission products and corrosion products that are radioactively contaminated are then able to float and permeate to the surface of the water, which could result in high dose rates to operators. In addition, it is possible for these fission products and corrosion/contamination products to adhere to the walls of the pond. Variations in the pond water level, due to evaporation or leakage, could allow these products to dry out, when they could then become airborne, causing possible ingestion hazards to operators and the risk of atmospheric pollution.

Moreover, in order to maintain adequate cooling and shielding, the pond integrity must be assured to very high limits. Small leaks could give rise to minor contamination problems, and larger leaks, resulting in loss of cooling water, may result in a serious district hazard.

As safety requirements for nuclear installations become more rigorous, and the allowable dose rates to operators continue to decrease, the need to design storage systems and other nuclear installations to even higher orders of integrity becomes essential, particularly as for various reasons it is now becoming necessary to store spent nuclear fuel for longer periods than was originally anticipated.

In United Kingdom patent application No. 2061798, there is described and claimed an alternative form of storage arrangement which substantially avoids the above-mentioned disadvantages. Such a storage arrangement comprises an enclosure for the fuel that utilizes air as its storage medium; an exhaust system for exhausting this air from the enclosure through filters so as to maintain the interior of the enclosure at subatmospheric pressure; and a transfer mechanism for transferring fuel into and from the enclosure.

Maintaining a depression or underpressure within the enclosure could eliminate the need for a high integrity envelope for the enclosure, as any leakage that might occur will be into the enclosure and, accordingly, the invention provides an inherently safer store than the usual water filled pond. In addition, as the fuel is stored in air rather than water, the risk of corrosion is reduced, and consequently the need for an operator to maintain the water chemistry at precise levels in order to prevent the generation of corrosion products, and the possibility of atmospheric pollution is thereby avoided.

Another form of dry storage arrangement for irradiated nuclear fuel is described in United Kingdom Patent Specification No. 1583303, such an arrangement comprising a grid having a plurality of openings for supporting respective fuel cans so that they extend downwards therefrom, the space above the grid forming an air filled enclosure associated with an exhaust system for exhausting air from the space through filters to maintain the interior of this space at subatmospheric pressure, and the arrangement including means for producing a flow of cooling air over the exterior of the cans. In use of such an arrangement, the fuel is first enclosed in cans, and the cans placed in openings in the grid, the unused openings being sealed with lids. However, the lids need to be removed for accommodating further cans, which is inconvenient, and failure of a can could give rise to contamination of the cooling air, with the risk of polluting the atmosphere.

SUMMARY OF THE INVENTION

An object of the invention is to provide an alternative form of dry storage arrangement which avoids these disadvantages and has other benefits as will be apparent from the following description.

According to the invention, a storage arrangement for nuclear fuel comprises a plurality of storage tubes each of which is closed at one end and is closeable at the other end by a removable plug, a pipe connecting the interior of each tube to manifolds serving a plurality of tubes, venting or flow control means connected to a manifold for maintaining the interiors of the respective tubes, when the plugs are fitted thereto, at a positive pressure above atmosphere, or atmospheric pressure, or at a subatmospheric pressure, and means for producing a flow of cooling fluid over the exterior surfaces of the tubes.

The storage system allows the nuclear fuel to be stored in air or in an alternative non-oxidizing gas. The alternative gas will allow fuel to be stored at a higher temperature without damage to the fuel. This may be necessary for limited periods when fuel heat output is too great to give acceptable temperatures for storage in air.

The venting system allows selection of the interior pressure of the tubes depending upon the choice of gas within the storage tube. This invention allows for the use of an alternative gas in the tubes held at a controlled positive pressure greater than atmospheric pressure or the use of air in the tube at atmospheric pressure. An exhauster connected to the venting system also allows the tube pressure to be reduced to below atmospheric pressure for routine leak checking procedures or in the event of tube leakages developing. The depression maintained within the tubes by the exhauster effectively forms a secondary containment system by causing air to flow inwards through leakage paths in the tubes.

The use of a venting system connected to individual tubes by a manifold and pipe arrangment has the advantage of limiting the spread of radioactive particles throughout the storage system compared with an arrangement in which the tubes communicate with a common chamber. In addition, it enables fault conditions that might arise to be more rapidly detected; the use of a plurality of manifolds each serving a respective series of storage tubes also enables faults to be quickly traced by isolating different sections of the manifold system.

Monitors for detecting any rise in radiation levels can be situated in any convenient part of the venting system. Monitors for detecting the flow of gas to or from the storage tubes can be situated in any convenient part of the venting system to allow leakage flows to be measured. When air is used in the tubes and the venting system is arranged to maintain atmospheric pressure, all pressure loads on the tube are removed, thereby reducing pressure stress in the tube walls and reducing the significance of any leakage paths. The natural atmospheric temperature and pressure fluctuations causes gas within the tubes to flow inwards or outwards via the venting system to the atmosphere via filters. It will be understood that the filters associated therewith must, of course, be of the kind suitable for preventing the escape of radioactive particles from the storage tubes.

In that the fuel to be stored may have been previously stored in water, the invention deals with the unintentional retention of small quantities of this water in cavities within the fuel assembly. Such water may have a deleterious effect on the fuel during long periods of storage if not removed from the storage tubes. The venting system allows water vapor that may be generated within the tube, from the fuel, to pass to atmosphere. Air that flows back into the tubes during natural pressure and temperature fluctuations is caused to pass through an air drying system. This natural self sumping feature of the invention, whereby moist air will flow outward and dry air allowed to flow inward, is used to reduce the quantity of water vapor that may exist in the tubes, thereby removing the potential for fuel degradation caused by corrosion.

The storage of fuel in storage tubes forming a part of the storage structure means that the fuel does not first have to be placed into sealed cans, which is an advantage as canning involves an additional process and moreover removes the ability to check the fuel easily. Furthermore, canning gives rise to additional contaminated waste which must ultimately be disposed of. The storage tubes can be reused after removal of the fuel.

Each storage tube forms a single walled containment boundary. The tubes are conveniently supported vertically with their closeable ends fitting closely within respective openings in the base of the charging hall used for the transfer of fuel into and from the tubes, so that the tubes extend downwards into the cooling chamber through which air is caused to pass. Preferably, the chamber has a vertical air inlet volume on one side of the plurality of storage tubes and a vertical outlet volume on the opposite side so that air is caused to flow across the chamber, and over the tube surfaces, by a natural thermosyphon process that is enhanced by a chimney connected to the outlet volume.

It will be seen that for a given store geometry the amount of air flow is governed by the heat generated within the store, so that the cooling is self-regulatory. Preferably, the air-flow conditions are arranged to be sufficient for the fuel within the tubes to be maintained at a temperature of not more than 180° C. under all normal storage conditions when air is used within the tubes.

The tubes preferably have shoulders adjacent their upper ends which, combined with ledges within the respective openings, provide a barrier to radiation from the fuel passing to the charge hall. The tubes, being supported from the floor of the cooling chamber, are free to thermally expand upwards.

This method of support enables tubes to be readily withdrawn upwards from the cooling chamber into the charge hall for replacement should this prove to be necessary.

Seals are preferably provided between the plugs and the walls of the tubes so that the plugged tubes effectively form gas-tight enclosures.

When the plugs are in their operating position, they are preferably surmounted by removable tiles which together provide a floor to the charging hall. It will be understood that both the charging hall and cooling chamber should be surrounded by adequate radiation shielding, preferably of reinforced concrete.

A storage structure can be built up in modular fashion utilizing a plurality of independently operable storage arrangements in accordance with the invention.

BRIEF DESCRIPTION OF THE DRAWINGS

One embodiment of the invention will now be described, by way of example, with reference to FIGS. 1-3 of the accompanying schematic drawings, in which.

DETAILED DESCRIPTION OF THE PREFERRED EMBODIMENTS

Figure 2:
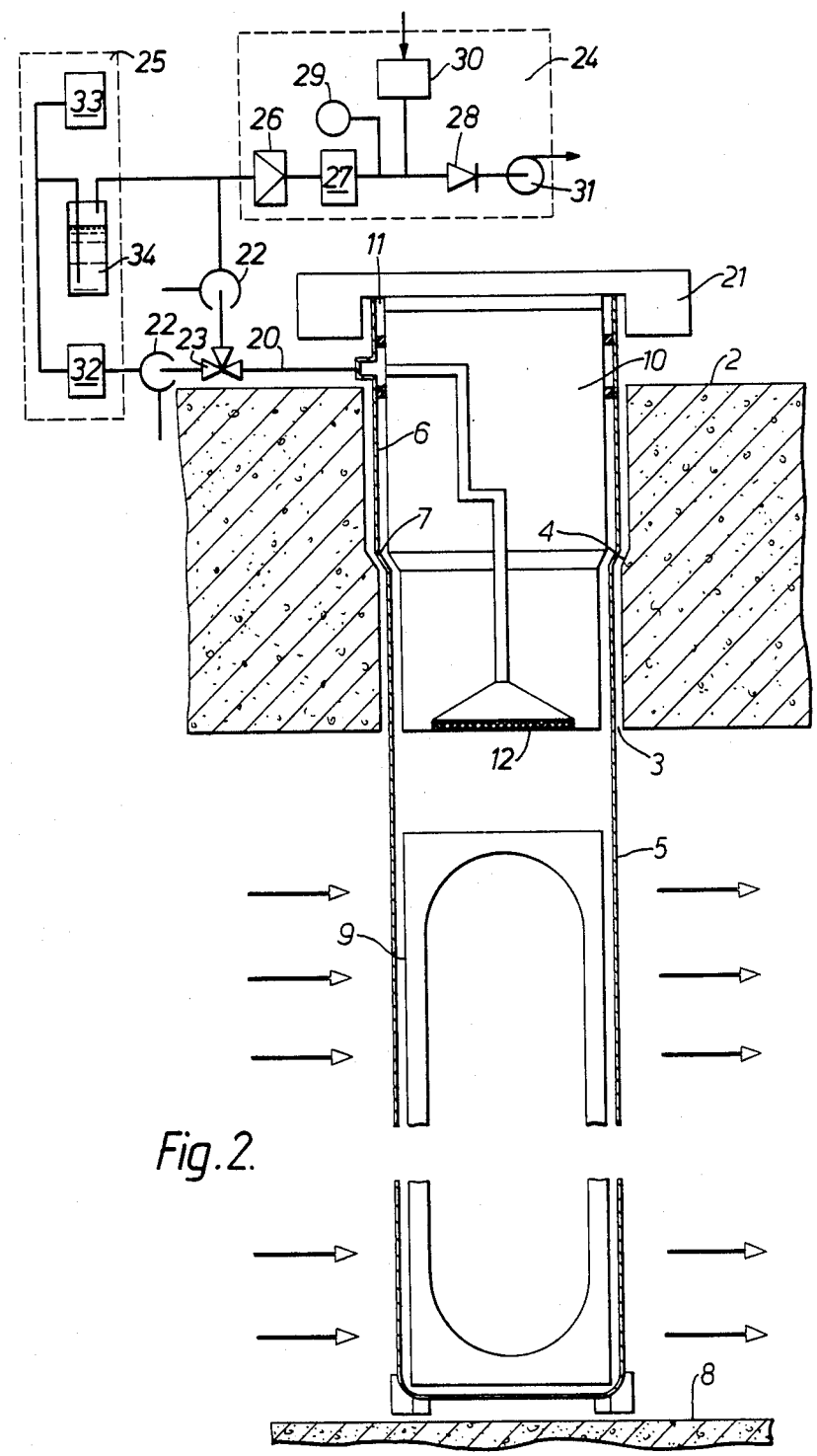
FIG. 2 represents, on an enlarged scale, an individual storage tube of the arrangement shown in FIG. 1.

The storage arrangement comprises a chamber 1 having walls, floor and ceiling of reinforced concrete. The ceiling 2 of the chamber is pierced by a matrix of openings 3, the upper ends of which have a slightly greater diameter than the lower ends as shown more clearly in FIG. 2, ledge 4 joining the parts of greater and lesser diameter. Each of the openings 3 has, located within it, the upper end of a storage tube 5 of steel, the top section 6 of the part of the tube within the opening 3 being of greater diameter than the remainder and being connected to it by an annular shoulder 7. The stepped annular gap so formed provides attenuation to radiation from the tube contents. The tubes 5 are supported from the floor 8 of the chamber 1 and are free to expand thermally upwards through openings 3.

The tubes 5, which are closed at the bottom, serve to store irradiated nuclear fuel as at 9, and their upper ends are closed by plugs 10 which are supported within the tubes by the inner surfaces of the inclined shoulders 7. A double seal 11 is provided between the top of each plug and the tube, and each tube/plug assembly is surmounted by a removable tile 21, the tiles together forming the floor of a charge hall 12 (FIG. 3), the walls and roof of which are also of reinforced concrete, and in which there is located a charge machine and gantry 13, of any convenient construction, for introducing fuel into and removing it from the storage tubes 5.

The floor of the chamber 1 has an opening 14 which communicates, via an inlet duct 15, with a louvred air inlet 16 (FIG. 3), and the ceiling 2 of the chamber has a further opening 17 leading into a discharge stact 18 extending upwards to a louvred air outlet 19 disposed a distance above the air inlet 16. The opening 17 is located at the opposite side of the chamber to the inlet opening 14, and in use decay heat from spent fuel 9 within the storage tubes 5 is transferred to the walls of the tubes by conduction, convection and radiation.

Figure 1:
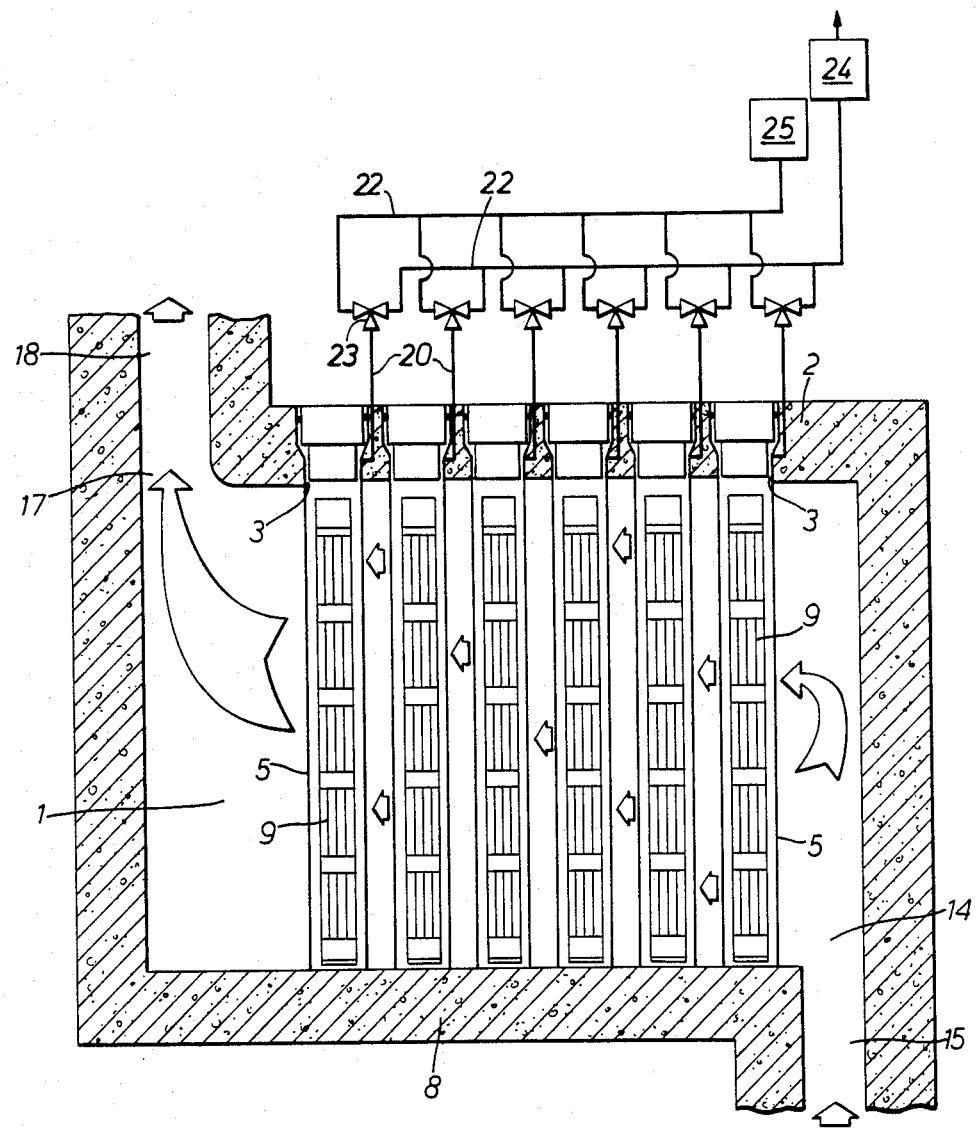
FIG. 1 illustrates diagrammatically a sectional view of part of the storage arrangement.

The heat is removed from the tubes 5 to the atmosphere by a natural thermosyphon process, the heated air rising within the outlet stack 18 by convection, and being replaced by cooler air drawn into the chamber 1 through the inlet opening 14. The disposition of the inlet and outlet openings 14, 17 at opposite sides of the chamber 1 ensures that there is a flow of air between the tubes in a direction transverse to the tube axes, as well as vertically, as indicated by the arrows in FIG. 1, which gives rise to optimum cooling. It will be seen that the amount of air flow is governed by the heat generated within the store, and the arrangement is designed to be sure that the cooling is adequate to maintain the fuel within the tubes at a safe temperature, consistent with the gas used within the tubes.

In accordance with the invention, the interior of each tube 5 communicates, by means of a pipe 20, connected to the side of the tube between the seals 11, to manifolds 22 common to a plurality of tubes, and by which the gas within the tubes can be changed and the pressure controlled. A hole in the plug 10 leads from the space between the seals 11 to a cavity in the base of the plug 10. The cavity is closed by a porous metal filter 12 that limits the passage of radioactive particles passing into the pipe 20. A suitable service point valve 23 associated with each tube allows the pipe 20 to be connected to a manifold 22 leading to an air extraction system 24 or to a second manifold 22 leading to an alternative gas system 25. The service point valve 23 also allows individual storage tubes to be isolated from the manifolds 22, if desired, in order to permit a rapid segregation of tubes should a fault condition occur, thereby enabling the fault position to be speedily traced. The air system 24 incorporates a suitable filter 26 followed by a flow measuring device 27, a one-direction valve 28 permits the outflow of gas from the air system 24. An exhauster 31 connected after the one-direction valve 28 allows gas to be drawn from the system until a depression is established in the tubes 5. The exhauster 31 is operated when leak checking of the connected tubes 5 are required or when leaks have been established because of unexpected faults. The discharge from the exhauster 31 passes to atmosphere. The flow measuring device 27 in conjunction with the operation of the exhauster 31 provides a measure of the leak tightness of the tubes 5.

The depression that is maintained within the storage tubes 5 supplements the high integrity sealed enclosure for the fuel created by the tube 5 and the sealed plug 10, as any leakage that occurs will be into the tubes 5. Similarly, any leakage that occurs at the seals 11 will also be inwards.

The use of an exhauster and a flow measuring device connected to pipes to the individual storage tubes has the practical advantage of enabling any fault conditions to be more rapidly detected.

A gas sampling point 29 allows the radioactive and moisture content of the gas in the system 24 to be measured by suitable instruments. Air drying equipment 30 supplies dry air to the system 24 when the pressure in the tubes 5 falls below a level set by suitable valves in the drying equipment 30.

The natural atmospheric temperature variations that act on the tubes 5 via the thermosyphon cooling system cause the air within the tubes to expand or contract. Expanding air passes from the system to the atmosphere via the filter 26 and one-way valve 28, carrying with it some water vapor. The inflow of air required as the air cools and contracts is supplied from the drying equipment 30.

The alternative gas system 25 incorporates a suitable flow measuring device 32, a source of low pressure gas 33 and a suitable pressure relief device 34 that vents to the air system upstream of the filter 26. The gas source 33 supplies gas at the required pressure to the tubes 5 when connected via the service point valve 23. The maxium pressure within the tubes is set by the pressure relief device 34 that allows excess gas to pass from the tubes 5 to atmosphere via the filter 26. The flow of gas measured with the flow measuring device 32 provides a measure of the leak tightness of the tubes 5.

If desired, portable monitors may also be used to check the conditions within the tubes 5 periodically by connection to tapping points on the individual pipes or to separate pipes communicating with the interiors of the respective tubes either through the tube walls or through the respective plugs 10.

The storage arrangement described has the advantage that it can be used to store uncanned fuel, enabling inspection and monitoring to be readily carried out. Moreover, removal of fuel from the store, should this become necessary, can be speedily effected, without the need to interfere with neighboring storage tubes, simply by removing the respective tile and plug. Re-use of the storage tubes after fuel removal is an operational option.

Moreover, the manner of supporting the storage tubes 5 enables a tube to be readily withdrawn upwards into the charge hall for examination or replacement should this be required.

Although the tiles 21 have been shown resting on the tops of the tubes 5, the skirt portions 27 of the tiles can be extended, if desired, so that these rest upon the surface of the concrete, giving a more even floor surface to the charge hall 12.

The storage tubes 5 will normally be of circular cross-section, but this is not essential, and other shapes may alternatively be employed. In some cases, the tubes may carry external cooling fins of any convenient configuration to enhance the cooling effect of the air flow.

Figure 3:
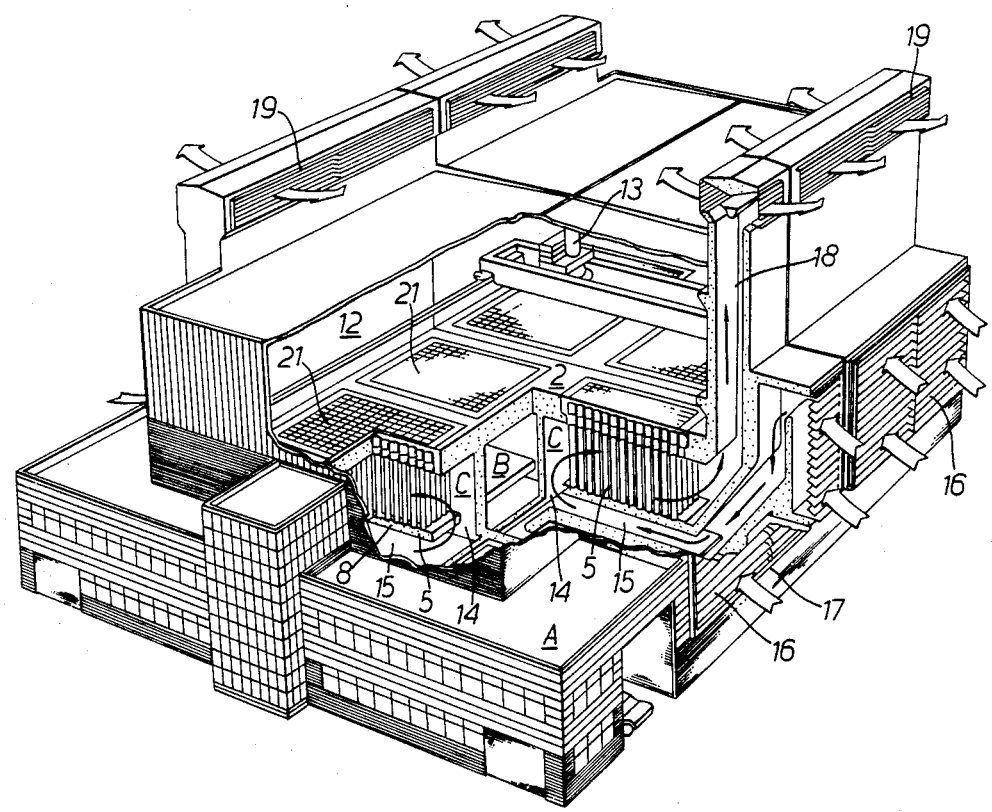
FIG. 3 shows a structure embodying a plurality of storage arrangements of the form illustrated in FIG. 1.

FIG. 3 shows a plurality of independent storage arrangement modules as described above, sections of which are shown at C, combined to form a nuclear storage structure having, in this case, a common receipt/dispatch building A for spent fuel or vitrified waste, and associated with a storage submodule for initially storing waste fuel before transfer to the charge hall and storage tubes. The charge hall 12 is common to all the storage modules, as in the gantry 13.

I claim:

1. A storage arrangement for storing uncanned irradiated nuclear fuels, comprising:
    (A) a plurality of storage tubes having exterior surfaces bounding individually sealed interiors in which uncanned irradiated nuclear fuels are contained;
    (B) means including a cooling chamber in which the fuel-containing tubes are mounted, for producing a cooling flow through the chamber and over the exterior surfaces of the tubes to cool the tubes and the fuels contained therein;

(C) a pluarlity of communication means, one for each tube, each communication means extending into and communicating with the interior of a respective tube; and (D) flow control means operatively connected to the plurality of communication means for controlling the flow of a storage gas into and out of individual tubes, and for individually controlling the pressure of the storage gas in individual tubes, said flow control means including
  (i) a source of the storage gas,
  (ii) supply means including a supply manifold for delivering the storage gas to more than one of the communication means at a predetermined pressure to fill their associated tubes,
  (iii) exhaust means for removing the storage gas, and
  (iv) selector means for operatively connecting the communication means associated with each individual tube to one of the supply means and the exhaust means.

2. The storage arrangement as recited in claim 1, wherein the supply means includes means for measuring the flow of the storage gas being delivered by the supply manifold.

3. The storage arrangement as recited in claim 1, wherein the supply means includes means for limiting the maximum pressure of the storage gas being delivered by the supply manifold.

4. The storage arrangement as recited in claim 1, wherein the supply manifold includes a plurality of supply manifold sections, each section delivering the storage gas to more than one of the communication means.

5. A storage arrangement for storing uncanned irradiated nuclear fuels, comprising:
  (A) a plurality of storage tubes having exterior surfaces bounding individually sealed interiors in which uncanned irradiated nuclear fuels are contained;
  (B) means including a cooling chamber in which the fuel-containing tubes are mounted, for producing a cooling flow through the chamber and over the exterior sufaces of the tubes to cool the tubes and the fuels contained therein;
  (C) a plurality of communication means, one for each tube, each communication means extending into and communicating with the interior of a respective tube; and
  (D) flow control means operatively connected to the plurality of communication means for controlling the flow of a storage gas constituting air into and out of individual tubes, and for individually controlling the pressure of the air, in individual tubes, said flow control means including
    (i) supply means for supplying the air at atmospheric pressure,
    (ii) exhaust means for removing the air, and
    (iii) selector means for operatively connecting the communication means associated with each individual tube to one of the supply means and the exhaust means.

6. A storage arrangement for storing uncanned irradiated nuclear fuels, comprising:
  (A) a plurality of storage tubes having exterior surfaces bounding individually sealed interiors in which uncanned irradiated nuclear fuels are contained;
  (B) means including a cooling chamber in which the fuel-containing tubes are mounted, for producing a cooling flow through the chamber and over the exterior surfaces of the tubes to cool the tubes and the fuels contained therein;
  (C) a plurality of communication means, one for each tube, each communication means extending into and communicating with the interior of a respective tube; and
  (D) flow control means operatively connected to the plurality of communication means for controlling the flow of a storage gas into and out of individual tubes, and for individually controllng the pressure of the storage gas in individual tubes, said flow control means including
    (i) supply means for supplying the storage gas at a predetermined pressure,
    (ii) exhaust means including an exhauster and an exhaust manifold for removing the storage gas at a predetermined pressure from more than one of the communication means to exhaust their associated tubes, and
    (iii) selector means for operatively connecting the communication means associated with each individual tube to one of the supply means and the exhaust means.

7. The storage arrangement as recited in claim 6, wherein the exhaust means includes means for filtering radioactive matter in the removed storage gas.

8. The storage arrangement as recited in claim 6, wherein the exhaust means includes means for measuring the flow of the storage gas being exhausted from the exhaust manifold.

9. The storage arrangement as recited in claim 6, wherein the exhaust means includes means for monitoring the radiation and moisture levels in the removed storage gas.

10. The storage arrangement as recited in claim 6, wherein the exhaust means includes means for preventing backflow of the removed storage gas.

11. The storage arrangement as recited in claim 6, wherein the exhaust manifold includes a plurality exhaust manifold sections, each section removing the storage gas from more than one of the communication means.

12. The storage arrangement as recited in claim 6, wherein the storage gas is air, and the exhauster removes the air and produces a subatmospheric pressure in the exhausted tubes.

13. A storage arrangement for storing uncanned irradiated nuclear fuels, comprising:
  (A) a plurality of storage tubes having exterior surfaces bounding individually sealed interiors in which uncanned irradiated nuclear fuels are contained;
  (B) means including a cooling chamber in which the fuel-containing tubes are mounted, for producing a cooling flow through the chamber and over the exterior surfaces of the tubes to cool the tubes and the fuels contained therein;
  (C) a plurality of communication means, one for each tube, each communication means extending into and communicating with the interior of a respective tube; and
  (D) flow control means operatively connected to the plurality of communciation means for controlling the flow of a storage gas into and out of individual tubes, and for individually controlling the pressure of the storage gas in individiual tubes, said flow control means including
  (i) an exhauster for removing the storage gas from individual tubes, and
  (ii) means for admitting a dried storage gas into the gas-removed tubes for replacing the storage gas removed therefrom.

14. A storage arrangement for storing uncanned irradiated nuclear fuels, comprising:
  (A) a plurality of storage tubes having exterior surfaces bounding individually sealed interiors in which uncanned irradiated nuclear fuels are contained;
  (B) means including a cooling chamber in which the fuel-containing tubes are mounted, for producing a cooling flow through the chamber and over the exterior surfaces of the tubes to cool the tubes and the fuels contained therein;
  (C) a plurality of communcation means, one for each tube, each communication means extending into and communicating with the interior of a respective tube; and
  (D) flow control means operatively connected to the plurality of communication means for controlling the flow of a storage gas into and out of individual tubes, and for individually controlling the pressure of the storage gas in individual tubes, said flow control means including supply and exhaust manifolds, each operatively connectd to sub-groups of the communication means to isolate the tubes in communication with the sub-groups of the communication means.

15. A storage arrangement for storing uncanned irradiated nuclear fuels, comprising:
  (A) a plurality of elongated storage tubes, each having a closed end and an opposite openable end, and having exterior surfaces bounding individually sealed interiors in which uncanned irradiated nuclear fuels are contained, each storage tube including a plug mounted in the openable end and closing the same, and means for sealing each plug in the openable end at a pair of spaced-apart sealing locations;
  (B) means including a cooling chamber in which the fuel-containing tubes are mounted, for producing a cooling flow through the chamber and over the exterior surfaces of the tubes to cool the tubes and the fuels contained therein;
  (C) a plurality of communication means, one for each tube, each communication means extending into and communicating with the interior of a respective tube, each communication means including a connecting pipe extending from the exterior of a respective tube and into the interior of the same at a location between said sealing locations, and a connecting passage extending throught the plug; and
  (D) flow control means operatively connected to the plurality of communication means for controlling the flow of a storage gas into and out of individual tubes, and for individually controlling the pressure of the storage gas in individual tubes.

16. The storage arrangement as recited in claim 15; and further comprising a porous filter mounted on the plug and extending across the connecting passage.

17. A storage arrangement for storing uncanned irradiated nuclear fuels, comprising:
  (A) a plurality of storage tubes having exterior surfaces bounding individually sealed interiors in which uncanned irradiated nuclear fuels are contained;
  (B) means including a cooling chamber in which the fuel-containing tubes are mounted, for producing a cooling flow through the chamber and over the exterior surfaces of the tubes to cool the tubes and the fuels contained therein, said cooling chamber including a ceiling having a plurality of support openings, one for each tube, extending through the ceiling, each tube being supported by a respective support opening so that the respective tube extends downward from the respective support opening;
  (C) a pluarlity of communication means, one for each tube, each communication means extending into and communicating with the interior of a respective tube; and
  (D) flow control means operatively connected to the plurality of communication means for controlling the flow of a storage gas into and out of individual tubes, and for individually controlling the pressure of the storage gas in individual tubes.

18. A storage arrangement for storing uncanned irradiated nuclear fuels, comprising:
  (A) a plurality of storage tubes having exterior surfaces bounding individually sealed interiors in which uncanned irradiated nuclear fuels are contained;
  (B) means including a cooling chamber in which the fuel-containing tubes are mounted, for producing a cooling flow of air through the chamber and over the exterior surfaces of the tubes to cool the tubes and the fuels contained therein;
  (C) an inlet for admittting the air into the cooling chamber from the environment at a low elevation, and an outlet for discharging the air into the environment at a high elevation, the cooling flow of air passing from the inlet over the tubes and then out throught the outlet;
  (D) a plurality of communication means, one for each tube, each communication means extending into and communicating with the interior of a respective tube; and
  (E) flow control means operatively connected to the plurality of communcation means for controlling the flow of a storage gas into and out of individual tubes, and for individually controlling the pressure of the storage gas in individual tubes.

* * * * *